United States Patent [19]

Heidtmann

[11] 4,377,199
[45] Mar. 22, 1983

[54] COMPONENT FOR A HEAT EXCHANGER
[75] Inventor: Uwe Heidtmann, Nussloch, Fed. Rep. of Germany
[73] Assignee: Brown, Boveri & Cie AG, Mannheim, Fed. Rep. of Germany
[21] Appl. No.: 92,644
[22] Filed: Nov. 8, 1979
[30] Foreign Application Priority Data
Nov. 10, 1978 [DE] Fed. Rep. of Germany ....... 2848797
[51] Int. Cl.³ ............................. F24J 3/02; F24F 1/32
[52] U.S. Cl. ......................................... 165/47; 52/522; 165/485; 29/157.3 C; 165/171; 52/518; 52/173 R
[58] Field of Search ...................... 165/48, 49, 53, 170, 165/47; 52/173 R, 518, 552, 522; 237/2 B; 126/432, 446, 449, 450, DIG. 2; 29/157.3 C

[56] References Cited
U.S. PATENT DOCUMENTS

| 1,559,967 | 3/1925 | King | 52/522 |
|---|---|---|---|
| 2,565,610 | 8/1951 | Kinghorn | 52/522 |
| 3,239,000 | 3/1966 | Meagher | 126/448 |
| 4,158,908 | 6/1979 | Block et al. | 29/157.3 C |
| 4,187,901 | 2/1980 | Coleman | 126/447 |
| 4,221,208 | 9/1980 | Murphy | 126/450 |
| 4,237,971 | 12/1980 | Olsson et al. | 126/447 |
| 4,254,822 | 3/1981 | Geier | 165/47 |

FOREIGN PATENT DOCUMENTS

| 2633862 | 2/1978 | Fed. Rep. of Germany | 126/446 |
|---|---|---|---|
| 2729313 | 1/1979 | Fed. Rep. of Germany | 126/432 |

Primary Examiner—William R. Cline
Assistant Examiner—Theophil W. Streule, Jr.
Attorney, Agent, or Firm—Herbert L. Lerner; Laurence A. Greenberg

[57] ABSTRACT

Component for a heat exchanger which exchanges heat between the environment and a liquid, having at least one tube for receiving the liquid, and at least one heat exchange surface heat-conductively connected to the tube, the heat exchange surface including a multiplicity of plate elements fastened to the tube, the plate elements being disposed in a row side by side and overlapping each other in adjoining regions.

10 Claims, 14 Drawing Figures

COMPONENT FOR A HEAT EXCHANGER

The invention relates to a component for a heat exchanger which is intended for heat exchange between the environment and a liquid and includes at least one exchange surface which is supported by at least one tube provided for receiving the liquid, and is in heat-conducting connection with the tube.

One known component of this type includes a centrally disposed tube which is provided on both sides thereof with heat collector wings in the form of sheet metal that absorb the ambient heat such as solar and/or air heat, and pass it on to the heat carrier flowing in the tube. This requires a highly heat-conducting joint between the tube and the exchange surface. In the case of long components, however, this leads to difficulties because the differences in expansion between the hot exchange surface and the colder tube carrying the heat carrier can lead to distortion and deformation of the component as well as to a destruction of the joints between the tube and the exchange surface. This danger is especially present in the case of large material-related differences between the thermal expansion coefficients of the exchange surface and the tube.

It is accordingly an object of the invention to provide a component for a heat exchanger which overcomes the hereinafore-mentioned disadvantages of the heretofore known devices of this general type and which is not subject to warping, bending or the formation of cracks at the joints, in spite of a highly heat-conducting joint between the tube and the exchange surface which can be of any length and made with any choice of material for the tube and the exchange surface. In addition, the component should be of simple and therefore cost-efficient construction and at the same time be universally usable and, in particular, suitable for installation on steep roofs or as a covering for such roofs.

With the foregoing and other objects in view, there is provided, in accordance with the invention, a component for a heat exchanger which exchanges heat between the environment and a liquid, having at least one tube for receiving the liquid, and at least one heat exchange surface heat-conductively connected to the tube, the heat exchange surface comprising a multiplicity of plate elements fastened to the tube, the plate elements being disposed in a row side by side and overlapping each other in adjoining regions.

The exchange surface is therefore composed of several plate elements which are disposed next to each other and are each fastened to the tube in a highly heat-conducting manner, so that equalization for different material expansions of the tube and the exchange surface at the transition from one plate element to another, is possible. Bending, warping or cracks in the joints between the tube and the plate elements are thereby avoided and the scale or shingle-like overlap of the individual plate elements results in a closed, optionally rain-tight exchange surface of maximum size for a given outline.

The overlap of the individual plate elements is from about 3 to 10 cm, and the adjoining areas of the plate elements fastened to the tube have a length of from about 20 to 50 cm, so that the total length of a plate element is about 23 to 60 cm. The magnitude of the expansion differences between the material of the tube and the exchange surface must be taken into consideration for setting the dimensions; for larger expansion differences such as occur, for instance, in the case of a tube formed of steel and a plate element formed of aluminum, a value of about 30 to 40 cm can be taken as a guidepost or standard value for the maximum fastening length of the plate element to the tubes. These standard values apply for all embodiment examples, as far as applicable.

In the simplest case, the plate elements are in the form of substantially flat, preferably rectangular sheet metal panels; it is more advantageous, however, in accordance with another feature of the invention, to provide at least one corrugated section integral with each of the plate elements, the tube being disposed in the corrugated section. In accordance with a further feature of the invention, there are provided a multiplicity of corrugations and a multiplicity of tubes uniformly distributed in the corrugations. This increases the exchange surface and enhances the stability.

In accordance with an added feature of the invention, there are provided substantially flat sections integral with each of the plate elements and disposed between each adjacent pair of corrugated sections. These can meet esthetic requirements, in particular.

In accordance with an additional feature of the invention, in the overlapping region, a part of one plate element overlaps a part of another plate element, the one plate element having a pressed-out portion beginning at a given point thereon, the pressed-out portion being engageable over the part of the other plate element and leaving a space between the given point and the end of the other plate element. This provides a component which allows the construction of a pleasing heat exchanger.

In accordance with still another feature of the invention, in the overlapping regions, a part of one plate element overlaps a part of another plate element, and the invention includes a bend disposed on the edge of each of the parts, the bends facing in direction toward the other of the parts.

In accordance with still an additional feature of the invention, the bends are spaced apart from each other, and the invention includes another bend disposed on the first-mentioned bend on the one plate element, the other bend being disposed in the space and being in contact with the other plate element.

In accordance with still a further feature of the invention, there is provided at least one holding tab disposed on the other plate element in the overlapping region, the holding tab extending at least partially over the other bend and advantageously pushing the latter against the other plate element.

In accordance with yet another feature of the invention, there is provided a step formed in the tube at the overlapping region.

In accordance with yet a further feature of the invention, the plate elements are substantially flat and in the overlapping regions a part of one plate element overlaps a part of another plate element, and the invention includes a bent-up portion formed on the one plate element forming a gap between the parts of the plate elements.

In accordance with yet an added feature of the invention, the bent-up portion is bent at an angle which allows rain to flow from the one plate element to the other plate element down the slope of an inclined roof without backing up, when the plate elements are disposed on the inclined roof.

In accordance with yet an additional feature of the invention, the plate elements are disposed on an angle and the bent-up portion is disposed in a plane which points below the horizontal in direction facing away from the one plate element.

In accordance with again another feature of the invention, the bent-up portion includes a section which is substantially parallel to the other plate element.

In accordance with again a further feature of the invention, there is provided a bend disposed at the end of the bent-up portion and facing in direction toward the other plate element as a water ledge.

In accordance with again an added feature of the invention, there are provided means clampable to the tubes for anchoring the component.

In accordance with again an additional feature of the invention which is satisfactory esthetically and is therefore highly suitable as a roof covering for residential homes, the plate elements are substantially flat and the invention includes bends disposed on the two opposite edges thereof which extend transversely to the edges of the overlapping region for connecting adjacent plate elements to each other.

In accordance with another feature of the invention, one of the bends is substantially U-shaped and the other of the bends is substantially L-shaped, the width of the horizontal portion of the L-shaped bend being matched to the inside width of the horizontal portion of the U-shaped bend, whereby the L-shaped bend of a plate element is engageable within the U-shaped bend of an adjacent plate element.

In accordance with a further feature of the invention, the plate elements are formed of a material which is softer than the material of which the tube is formed.

The heat absorption is particularly high and the overall construction is particularly inexpensive if, in accordance with still another feature of the invention, the plate elements are formed of a material from the group consisting of aluminum and copper and the tube is formed of steel.

In accordance with a concomitant feature of the invention, there is provided a steel wire wound around the tube, the tube and wire being pressed into the plate element over at least a portion of the circumference of the tube.

Other features which are considered as characteristic for the invention are set forth in the appended claims.

Although the invention is illustrated and described herein as embodied in component for a heat exchanger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Like parts are provided with the same reference symbols in the individual figures.

Figure 1:
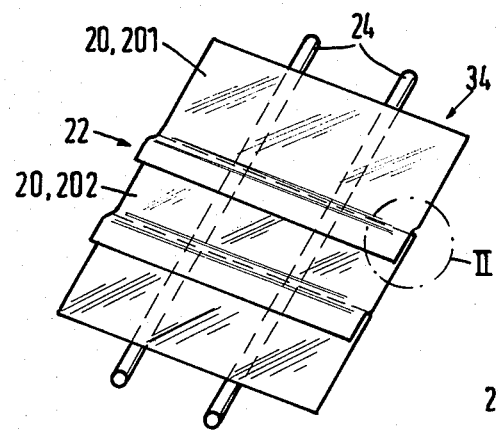
FIG. 1 is a diagrammatic perspective view of a component according to the invention, with flat plate elements.

Referring now to the figures of the drawings and first, particularly, to FIG. 1 thereof, there are shown three substantially flat plate elements 20 of rectangular shape, which form an exchange surface 34. The individual plate elements 20 overlap in scale or shingle-fashion in adjoining regions and form the overlap region 22. The component is held together by tubes 24 which extend along behind the component and to which the individual plate elements 20 are fastened in a continuous and highly heat-conducting manner. As can be seen from FIG. 1, the plate elements 20 are disposed next to each other in such a manner that their long sides overlap, the straight tubes running approximately parallel to the small sides of the plate elements 20 and being uniformly distributed thereat. The spacing of the tubes is between about 10 to 30 cm, and the profile of the tubes may have any shape, but is preferably round.

Figure 2:
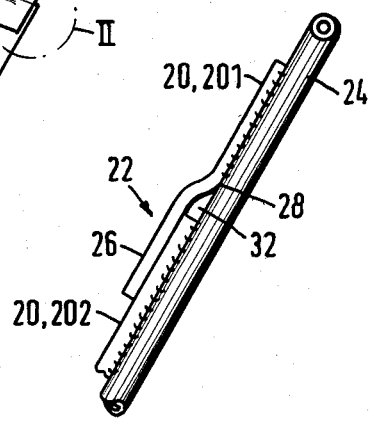
FIG. 2 is an enlarged perspective view of the dot-dash circle II of FIG. 1, taken from the side.

FIG. 2 shows the overlap region 22 in an enlarged and detailed side view. Accordingly, the covering plate element 201 has a pressed-out portion 26 in the overlap region 22; this portion extends over the covered-up plate element 202 and rests thereon. Between the root 28 of the pressed-out portion 26 and the end of the covered-up plate element 202, a space 32 is provided. If the length of the pressed-out portion 26 is in the preferable range of from 3 to 10 cm, then the length of the space 32 will be about 1 to 3 cm (in the axial direction of the tube).

The dimensions of the plate element 20 in the direction of their longer rectangular sides i.e. transversely to the direction of the straight tubes 24, can be arbitrary; the length of the short sides of the rectangle which point in the axial direction of the tubes 24, is determined by the expansion behavior of the tubes 24 and the plate elements 20. If the expansion differences are large, due to the materials used and/or considerable temperature differences between the plate elements and the tubes 24 carrying the heat carrier, for instance, then the short sides of the plate elements must not be too long so as to avoid warping, bending or internal stresses in the region of the joint between the tube and the plate element. If aluminum sheet (1 to 3 mm thick) is used for the plate elements 20 and steel for the tubes 24 (outside diameter preferably 10 to 15 mm), a maximum length of about 0.4 to 0.5 m can be used as a standard value for the short side of the plate element; this value includes the pressed-out portion 26, which may have a length of about 3 to 10 cm. For the dimension of the space 32 in the direction of the tubes 24, a standard value of 1 to 3 cm can be assumed. The component is disposed on the outside of buildings, particularly in regions exposed to the sun, so that for heating purposes, for instance, the ambient heat can be absorbed thereby. Since the component forms a closed surface, it can preferably be used, for instance, in lieu of tiles as a roof covering for buildings. In this way, several components can be disposed side by side and connected to each other by intermediate pieces in a rain-tight manner. The ends of the tubes 24 are connected to manifolds which take over the feeding and discharging of a heat carrier, such as water, for instance. The exchange surface formed by the plate elements 20 absorbs ambient heat, conducts the latter to the tubes 24, and the heat carrier flowing through the tubes 24 conducts the absorbed heat to the heating plant. The heat carrier may be very cold if, for instance, it is at outside air temperature, such as is the case when the components are inserted into a heat pump loop. If the exchange surfaces are then exposed to solar radiation, i.e. if they become relatively hot (about 65° C.), then differences in expansion come about which can be enhanced or caused solely by the choice of material, such as aluminum for the plate elements and steel for the tubes. These differences in thermal expansion are taken up by dividing the exchange surface into individual plate elements in cooperation with the spaces 32.

The above-mentioned advantages also come to bear if the component is used for giving off heat to the environment. Such a case exists if the component is used as a condenser of a refrigeration plant.

Figure 3:
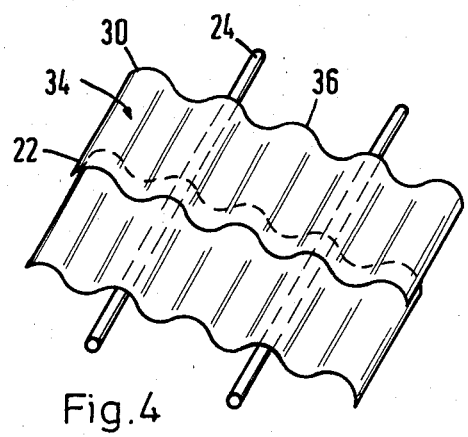
FIG. 3 is a perspective view similar to that shown in FIG. 1, of a second embodiment of the invention, with corrugated plate elements.

FIG. 3 shows an embodiment which is a variation of the component shown in FIG. 1. In the embodiment of FIG. 3, the plate elements 30 have corrugations 36 and the tubes are disposed in the corrugations, uniformly distributed.

Figure 4:
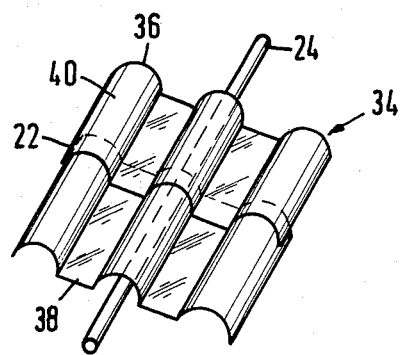
FIG. 4 is a perspective view of another embodiment of corrugated plate elements.

The plate elements 40 according to FIG. 4 also show corrugations where, contrary to the embodiment example of FIG. 3, a planar connecting part 38 is inserted between respective adjacent corrugations 36.

Figure 5:
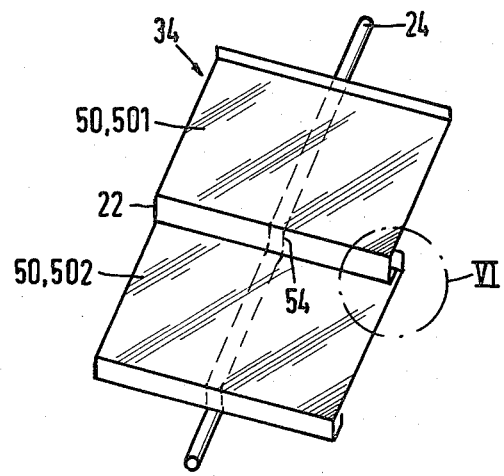
FIG. 5 is a diagrammatic perspective view of a component according to the invention with flat plate elements and bent-off edges in the overlap region.
Figure 6:
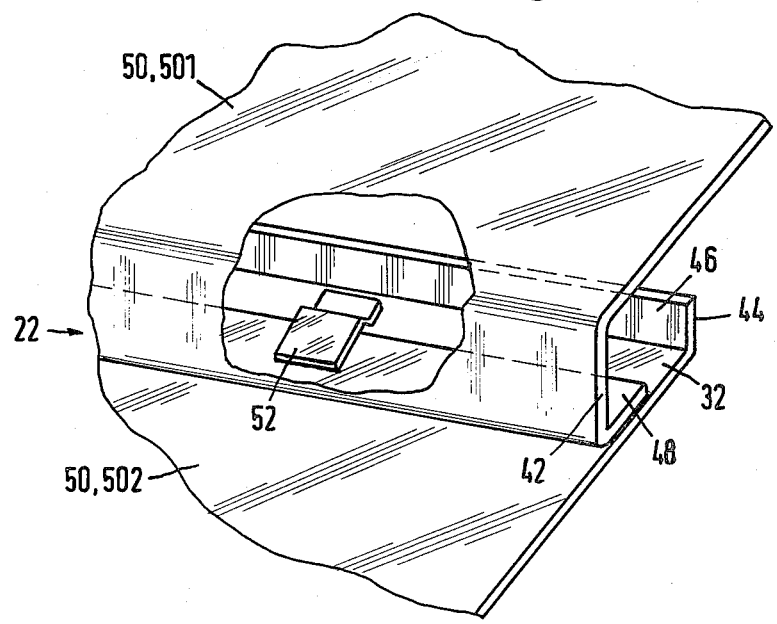
FIG. 6 is an enlarged perspective view, partly broken away, of the dot-dash circle VI of FIG. 5.

In the embodiment example according to FIG. 5, the individual plate elements 50 are likewise of rectangular shape and are substantially flat. However, after assembly, they form an exchange surface 34 which is not planar but rather has a step in the overlap region 22. The construction of the overlap region 22 can be clearly seen from FIG. 6, which shows the overlap region in detail.

Accordingly, the covering plate element 501 has at its end a first bent-up or bent-over edge 42, which is preferably bent at a right angle, and is directed toward the covered-up plate element 502. Similarly, the covered-up plate element 502 has at its end a second bent-up edge 44, which is also preferably bent at a right angle and is directed toward the covering plate element 501. Between the angled-off edges 42 and 44, a space 46 is formed, into which a third bent-up edge 48 protrudes. This third bent-up edge 48 rests with its outer surface on the covered-up plate element 502. The space 12 is provided between the second bent-up edge 44 and the end of the third bent-up edge 48 for taking up expansion differences. Several holding tabs 52 are further provided in the space 46. The tabs 52 are fastened to the respective covered-up plate element 502 and reach over the third bent-up edge 48 and thus prevent the covering plate element 502 from being lifted up.

The standard value for the height of the first bent-up edge 42 can be taken as 3 to 10 cm, and 1 to 3 cm can be taken as the standard value for the second bent-up edge 44. Regarding the dimensions of the overlap region and the space 32, the comments made above in connection with the embodiment example according to FIG. 1 apply quite generally.

In order to fit the tube 24 to the shape of the exchange surface 34, the tube is always formed with a step 54 in the overlap region 32. Optimally, pipe joints can be disposed in the overlap region 32 in order to simplify the fabrication of the component.

Figure 7:
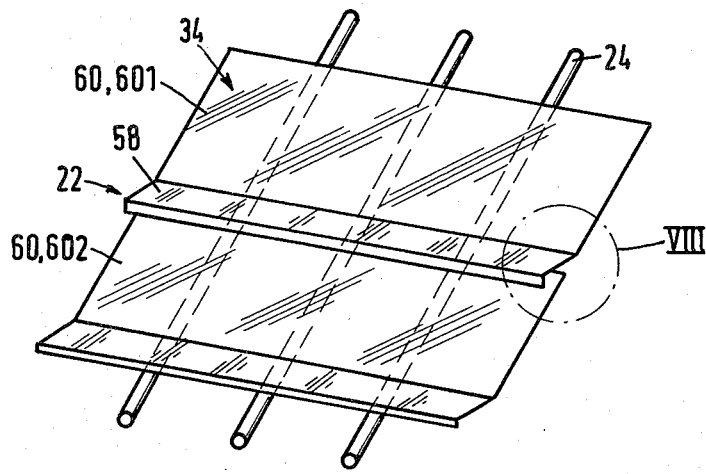
FIG. 7 is a diagrammatic perspective view of a further embodiment of the component according to the invention.

In FIG. 7, a further embodiment variation of the component according to the invention is shown. In FIG. 7, the individual plate elements 60, which form the exchange surface 34, are rectangular and substantially flat. The straight tubes 24, which are uniformly distributed over the exchange surface 34 and on which the plate elements 60 are fastened, run approximately parallel to the small sides of the plate elements 60.

In the overlap region 22, a gap 56 which is formed between a bent-up edge 58 of the covering plate element 601 and the covered plate element 602, is provided between the plate elements. This construction of the overlap region 22 is seen more clearly in FIG. 8, which shows in detail the area within the circle VIII of FIG. 7, in a side view. The bent-up portion 58 is made at an angle α. The angle is chosen so that if the component is disposed on a common steep roof, the rain water will run off over the bent-up portion 58 onto the covered-up plate element 602 without being backed up. To prevent the water from running back on the underside of the bent-up portion 58, a water ledge 64 is provided in the form of a bent-up edge. A space 32 is further provided between the covered plate element 602 and the covering plate element 601.

Figure 9:
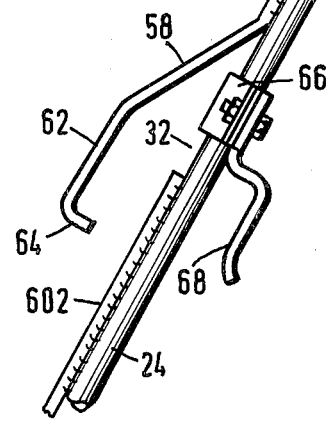
FIG. 9 is a variation of the embodiment of FIG. 8.

FIG. 9 shows a varying embodiment of the subject of FIG. 3. Between the bent-up edge 58 and the water ledge 64, a flat extension 62 is inserted. The flat extension 62 extends approximately in a direction parallel to the covered plate element 602 and gives the heat exchange surface a more pleasing appearance while simultaneously improving the rain-tightness.

In the space 32, some tubes 24 are provided with pipe clamps 66, to which a clamp-like bracket 68 that is open toward the bottom, is fastened. This bracket 68 serves for securing the component to buildings by hooking the bracket into transversal rods or slats.

The component according to the embodiment example of FIG. 7 is particularly well-suited for absorbing ambient heat. This is because outside air can also flow to the rear of the exchange surface 34 through the gap 56 and the space 32 and also be used for supplying heat when the component is disposed in front of a wall or on a roof. The utilization is improved further if sufficient space (for instance, 5 to 10 cm) is left between the exchange surface 34 and the surface of the wall or roof for good circulation of the outside air.

Figure 10:
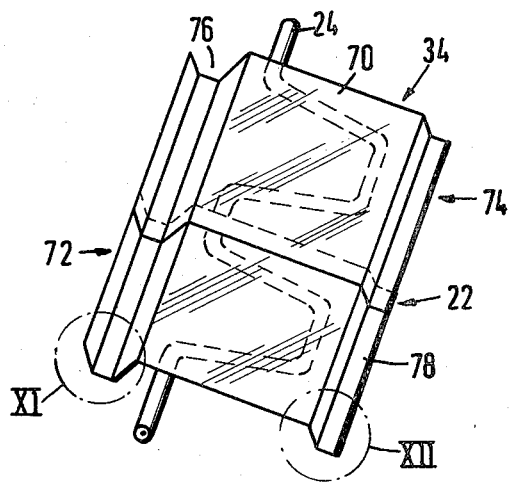
FIG. 10 is a diagrammatic perspective view of a component according to the invention with plate elements which have lateral profiles.

FIG. 10 shows rectangular plate elements 70 which have profiles 72 and 74 on those sides which extend approximately at a right angle to the overlap region 22. The plate elements therefore have approximately the appearance of tiles. The profiles 72 and 74 serve for the rain-tight connection of further lateral plate elements.

Figure 11:
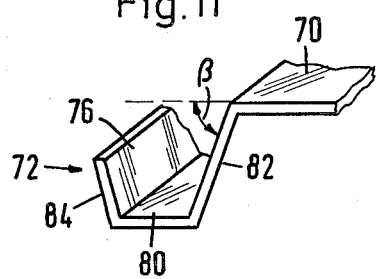
FIG. 11 is an enlarged view of the dot-dash circle XI of FIG. 10.
Figure 12:
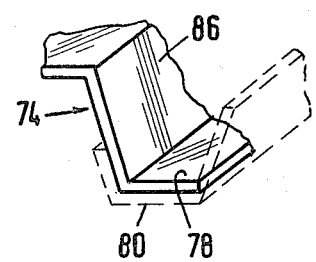
FIG. 12 is an enlarged view of the dot-dash circle XII of FIG. 10.

The construction of these profiles 72 and 74 can be seen in greater detail in FIGS. 11 and 12 which are enlargements of the circles XI and XII of FIG. 10. Accordingly, the left-hand profile 72 has the appearance of a U-shaped channel 76, which was formed by bending up the left-hand end region of the plate element 70. The first leg 82 of the bend extends at an angle $\beta$ of about 45° to 80° to the flat part of the plate element 70; the channel bottom 80 runs parallel to the flat part of the plate element 70, and the second leg 84, as far as its inclination is concerned, is symmetrical to the first leg 82, as is clearly seen from FIG. 11 so that the angle between the second leg 84 and the plate element 70 may be approximately equal to $\beta$.

The height of the second leg 84 is about one-half of the distance between the flat region of the plate element 70 and the channel bottom which is preferably about 3 to 10 cm.

On the right-hand side of the plate element 70, a second profile 74 is disposed. The profile 74 is formed by bending the right end of the plate element 70. This profile has the shape of the letter L. The vertical leg 86 of the profile 70 is the mirror image of the first leg 82, while the horizontal leg 78 is so large that it engages the channel of the adjacent plate element and can brace itself on the bottom 80 of the adjacent channel. This is illustrated in FIG. 12, where the channel of the adjacent plate element is drawn in dotted lines.

In the embodiment of FIGS. 10 to 12, the tube 24 is meander-shaped and a meandering loop is associated with each plate element 70, so that good heat removal from the individual plate elements is provided.

Figure 8:
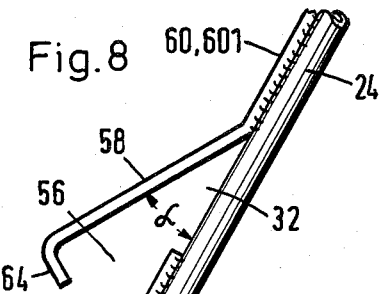
FIG. 8 is an enlarged perspective view of the dot-dash circle VIII of FIG. 7, taken from the side.

The joint between the plate elements and the tubes can be made in any manner such as by welding, for instance, as indicated in FIGS. 2, 8 and 9; it is only important for the tube to be fastened to the individual plate elements in a highly heat-conducting manner over the entire length which is provided. If the plate element is formed of a soft flowable material such as copper or, preferably, aluminum but the tube is formed of a harder material such as steel, then the joint can be made in a known manner such as is illustrated in FIGS. 13 and 14.

Figure 13:
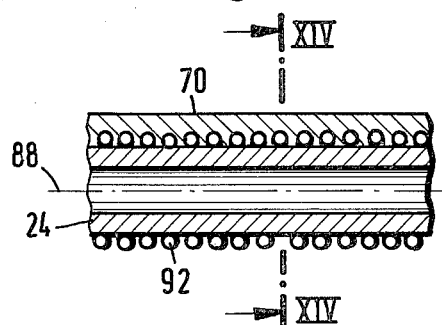
FIG. 13 is a diagrammatic longitudinal sectional view of a possible connection between a tube and a plate element.
Figure 14:
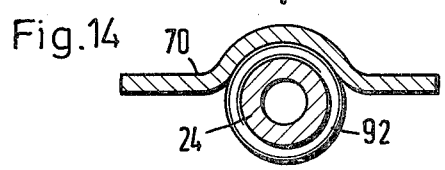
FIG. 14 is a cross sectional view of FIG. 13 taken along the line XIV—XIV, in the direction of the arrows.

FIG. 13 shows a cross sectional view through a plate element; the section being taken along the axis 88 of the tube 24.

On the outer surface of the tube 24, a helix 92 is fastened. This may be in the form of a helically wound steel wire, for instance. To join the tube 24 to the plate element 70, the tube is pressed onto the plate element as shown in FIG. 14, so that the softer material of the plate element flows around the harder profile of the helix and thereby establishes a good joint and anchorage between the plate element 70 and the tube 24.

The components according to the invention can also be curved, if desired, so that domed heat exchangers can also be produced. It is also possible, if the components are used for the absorption of solar radiation, to place them in a housing which is transparent and allows the penetration of sun rays.

There are claimed:

1. Component for a heat exchanger which exchanges heat between the environment and a liquid, having at least one tube for receiving the liquid, and at least one heat exchange surface heat-conductively connected to the tube, the heat exchange surface comprising a multiplicity of substantially flat plate elements having upper surfaces and lower surfaces fastened to the tube, said plate elements being disposed in a row side by side and overlapping each other in adjoining regions, in said adjoining overlapping regions one plate element having a planar part with an end and the other plate element having a bent-up part adjacent a flat part being fastened to the tube, said bent-up part of said other plate element overlapping said planar part of said one plate element forming a gap therebetween, said end of said planar part of said one plate element being spaced from said flat part of said other plate element fastened to the tube defining an interspace therebetween, said gap and interspace forming an air flow path from the upper surface to the lower surface of said plate elements.

2. Component according to claim 1, wherein said bent-up portion is bent at an angle which allows rain to flow from said one plate element to said other plate element down an inclined roof when said plate elements are disposed on the inclined roof.

3. Component according to claim 1, wherein said plate elements are disposed on an angle and said bent-up portion is disposed in a plane which points below the horizontal in direction facing away from said one plate element.

4. Component according to claim 1, wherein said bent-up portion includes a section which is substantially parallel to said other plate element.

5. Component according to claim 2, including a bend disposed at the end of said bent-up portion and facing in direction toward said other plate element forming a waterlip.

6. Component according to claim 1, including means clampable to the tubes for anchoring the component.

7. Component according to claim 1, wherein said plate elements are formed of a material which is softer than the material of which the tube is formed.

8. Component according to claim 7, wherein said plate elements are formed of a material from the group consisting of aluminum and copper and the tube is formed of steel.

9. Component according to claim 1, wherein said plate elements are disposed transverse to said tube, and said tube is continuous throughout said heat exchange surface of plate elements.

10. Component according to claim 1, wherein said air flow path extends across the width of said plate elements.

* * * * *